(12) United States Patent
Ikeda et al.

(10) Patent No.: US 11,788,551 B2
(45) Date of Patent: Oct. 17, 2023

(54) RADIATOR FAN

(71) Applicant: SUZUKI MOTOR CORPORATION, Hamamatsu (JP)

(72) Inventors: Kentaro Ikeda, Hamamatsu (JP); Tomonori Sugiyama, Hamamatsu (JP); Yuki Mochizuki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/858,711

(22) Filed: Jul. 6, 2022

(65) Prior Publication Data

US 2023/0040841 A1 Feb. 9, 2023

(30) Foreign Application Priority Data

Aug. 3, 2021 (JP) ................................ 2021-127685

(51) Int. Cl.
*F04D 29/54* (2006.01)
*B62J 41/00* (2020.01)
*F01P 5/06* (2006.01)
*F04D 29/70* (2006.01)
*F01P 3/18* (2006.01)

(52) U.S. Cl.
CPC ............ *F04D 29/541* (2013.01); *B62J 41/00* (2020.02); *F01P 5/06* (2013.01); *F04D 29/703* (2013.01); *F01P 3/18* (2013.01); *F01P 2050/16* (2013.01)

(58) Field of Classification Search
CPC ...... F04D 29/541; F04D 29/54; F04D 29/545; F04D 29/547; F04D 29/703; B62J 41/00; F01P 5/06; F01P 3/18; F01P 2050/16
See application file for complete search history.

(56) References Cited

U.S. PATENT DOCUMENTS

2013/0168039 A1 7/2013 Arai et al.
2019/0063301 A1* 2/2019 Morotomi .............. B60K 13/04

FOREIGN PATENT DOCUMENTS

JP 5829907 B2 10/2015

* cited by examiner

*Primary Examiner* — Jacob M Amick
(74) *Attorney, Agent, or Firm* — Stein IP, LLC

(57) ABSTRACT

There is provided a radiator fan configured to introduce outside air into a radiator in front of an engine. The radiator fan includes: a propeller disposed behind the radiator; a fan motor configured to drive the propeller to rotate; and a fan shroud covering the propeller from behind. The fan shroud is formed with a plurality of hoods whose exhaust air ports are directed in any directions in a range from a lateral direction to a downward direction.

7 Claims, 6 Drawing Sheets

RADIATOR FAN

CROSS-REFERENCE TO RELATED APPLICATIONS

This application is based on Japanese Patent Application No. 2021-127685 filed on Aug. 3, 2021, the contents of which are incorporated herein by way of reference.

TECHNICAL FIELD

The present invention relates to a radiator fan.

BACKGROUND

In general, in a straddle-type vehicle such as a motorcycle, a radiator is disposed in front of an engine. As a radiator fan of this type of radiator, there is known a radiator fan in which a fan shroud is provided behind the radiator fan (see, for example, Patent Literature 1). A propeller of the radiator fan described in Patent Literature 1 is covered by the fan shroud from behind, and an opening for directing exhaust air downward is formed in a lower surface of the fan shroud. The exhaust air passing through a radiator core is blown out from the opening of the fan shroud toward a vehicle lower side, thereby suppressing thermal damage to a rider caused by the exhaust air from the radiator fan.
Patent Literature 1: Japanese Patent No. 5829907

However, since the propeller of the radiator fan described in Patent Literature 1 is covered by the fan shroud from behind, there is a problem that traveling air and the exhaust air of the propeller is difficult to discharge from the radiator core, resulting in deterioration of cooling performance of the radiator. By forming a hole in the fan shroud, it is possible to improve the discharge of the traveling air and the exhaust air, but considering the thermal damage to the rider, a formation position of the hole in the fan shroud is limited, and a large improvement cannot be expected.

The present invention has been made in view of the above, and an object of the present invention is to provide a radiator fan capable of maintaining the cooling performance while suppressing the thermal damage to the rider.

SUMMARY

A radiator fan according to an aspect of the present invention is a radiator fan configured to introduce outside air into a radiator in front of an engine. The radiator fan includes: a propeller disposed behind the radiator; a fan motor configured to drive the propeller to rotate; and a fan shroud covering the propeller from behind. The fan shroud is provided with a plurality of hoods whose exhaust air ports are directed in any directions in a range from a lateral direction to a downward direction.

DESCRIPTION OF EMBODIMENTS

A radiator fan according to an aspect of the present invention introduces outside air into a radiator in front of an engine. A propeller of the radiator fan is disposed behind the radiator. The propeller is driven to rotate by a fan motor, and the propeller is covered by a fan shroud from behind. The fan shroud is provided with a plurality of hoods whose exhaust air ports are directed in any directions in a range from a lateral direction to a downward direction. Although the propeller is covered by the fan shroud from behind, since the plurality of hoods are formed in the fan shroud, it does not become difficult for traveling air and exhaust air of the propeller to discharge. In addition, since the exhaust air ports of the hoods are directed in any directions in the range from the lateral direction to the downward direction, hot air passing through a radiator core is less likely to be directed to a rider behind the engine. Therefore, cooling performance of the radiator fan can be maintained while suppressing thermal damage to the rider.

Embodiment

Figure 1:
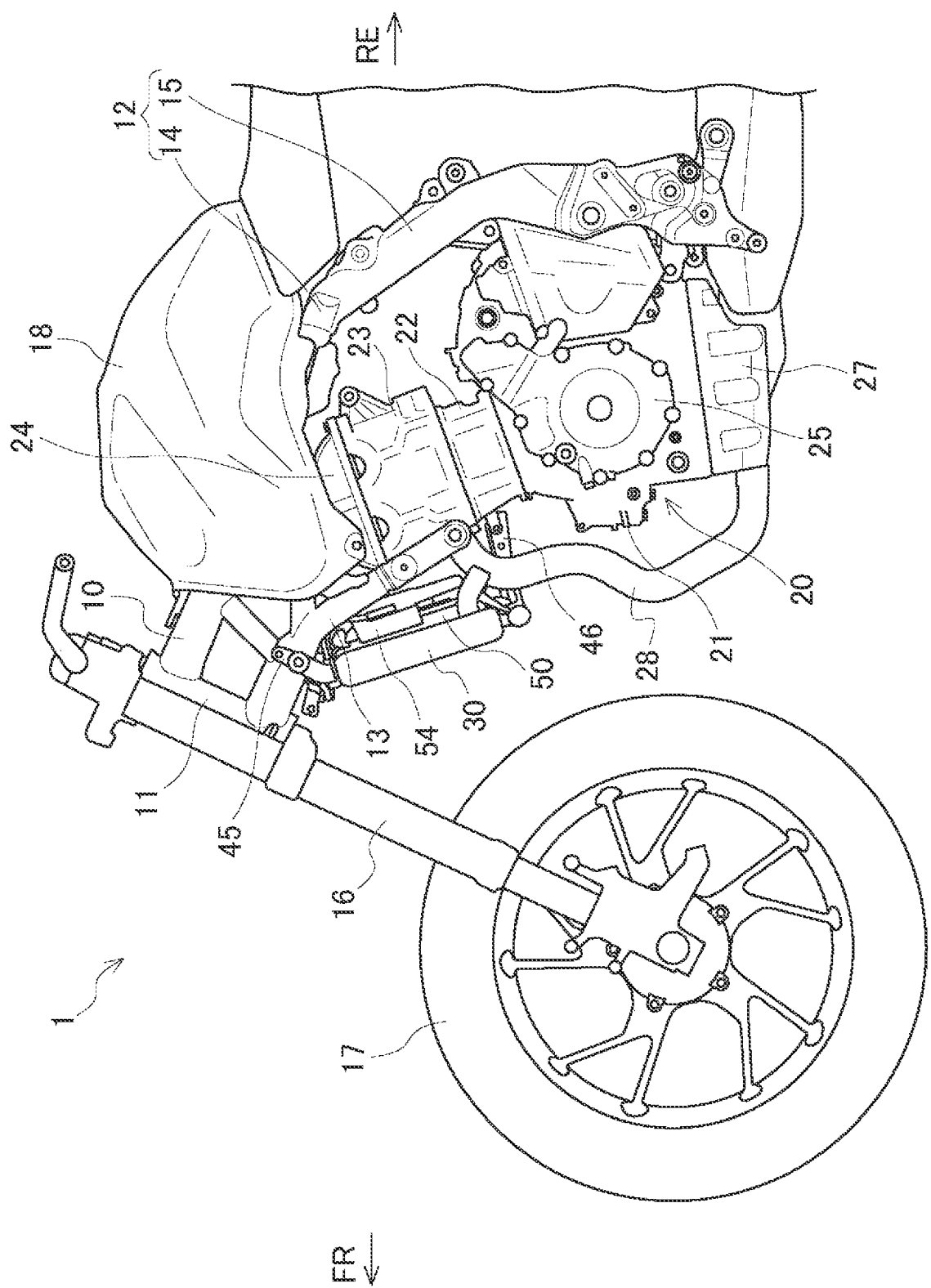
FIG. 1 a left side view of a vehicle front portion of a straddle-type vehicle according to an embodiment.

Hereinafter, an embodiment will be described in detail with reference to the accompanying drawings. FIG. 1 a left side view of a vehicle front portion of a straddle-type vehicle according to the present embodiment. Further, in the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is formed by mounting various components such as an engine 20 and an electrical system on a diamond-shaped vehicle body frame 10 formed of pipes and sheet metal. The vehicle body frame 10 includes a pair of main frames 12 branched from a head pipe 11 to the left and right and extending rearward, and a pair of down frames 13 branched from the head pipe 11 to the left and right and extending downward. A pair of front forks 16 are steerably supported by the head pipe 11 via a steering shaft (not shown), and a front wheel 17 is rotatably supported at lower portions of the front forks 16.

A front side portion of the main frame 12 is a tank rail 14 located above the engine 20, and a fuel tank 18 is supported by a tank rail 14 from below. A rear side portion of the main frame 12 is a body frame 15 located behind the engine 20, and a rear wheel (not shown) is supported by a lower half portion of the body frame 15 via, a swing arm (not shown). A rear portion of the engine 20 is supported by the pair of main frames 12, and a front portion of the engine 20 is supported by the pair of down frames 13. The engine 20 is supported by the vehicle body frame 10, such that rigidity of an entire vehicle is secured.

The engine 20 includes a crankcase 21 having an upper-lower divided structure. A cylinder 22, a cylinder head 23, and a cylinder head cover 24 are attached to an upper portion of the crankcase 21. A magneto cover 25 that covers a magneto (not shown) from a lateral side is attached to a left side surface of the crankcase 21. A clutch cover 26 (FIG. 6) that covers a clutch (not shown) from the lateral side is attached to a right side surface of the crankcase 21. An oil pan 27 in which oil is stored is attached to a lower portion of the crankcase 21. A pair of exhaust pipes 28 extend downward from a front surface of the cylinder head 23.

A radiator 30 is disposed in front of the cylinder head 23 of the engine 20 below the head pipe 11. Cooling water warmed in the engine 20 is sent to the radiator 30, and heat exchange is performed between the cooling water flowing through the radiator 30 and traveling air passing through the radiator 30. A radiator fan 50 that introduces outside air into the radiator 30 is provided on a rear surface side of the radiator 30. When the cooling water exceeds a predetermined temperature at the time of stopping, low-speed traveling, or the like, the radiator fan 50 is driven to rotate, so that the outside air is sent to the radiator 30, and the cooling water in the radiator 30 is forcibly cooled.

The radiator fan 50 is provided with a fan shroud 54 for suppressing thermal damage to a rider by exhaust air. When the radiator fan 50 is completely covered by the fan shroud 54 from behind, cooling performance of the radiator fan 50 deteriorates due to difficulty in discharge of the traveling air and the exhaust air of a propeller. When the radiator fan 50 is brought close to the exhaust pipes 28, motor performance of the radiator fan 50 deteriorates due to heat of the exhaust pipes 28. When the radiator fan 50 is moved away from the exhaust pipes 28, there is a possibility that small stones that are flipped up by the front wheel 17 enter a gap between the radiator fan 50 and the exhaust pipes 28 to cause the fan being locked.

Therefore, in the fan shroud 54 according to the present embodiment, a plurality of hoods 61 (see FIG. 2) whose exhaust air ports are directed downward or laterally are formed. The plurality of hoods 61 of the fan shroud 54 suppress the thermal damage to the rider, and improve the discharge of the traveling air and the exhaust air of the propeller. Further, a motor of the radiator fan 50 is cooled by using the traveling air and the exhaust air of the propeller from the exhaust air ports of some of the hoods 61. The motor performance is maintained even when the radiator fan 50 and the exhaust pipes 28 are brought close to each other. Since the gap between the radiator fan 50 and the exhaust pipes 28 is narrowed, the small stones that are flipped up by the front wheel 17 are less likely to enter the radiator fan 50.

Figure 2:
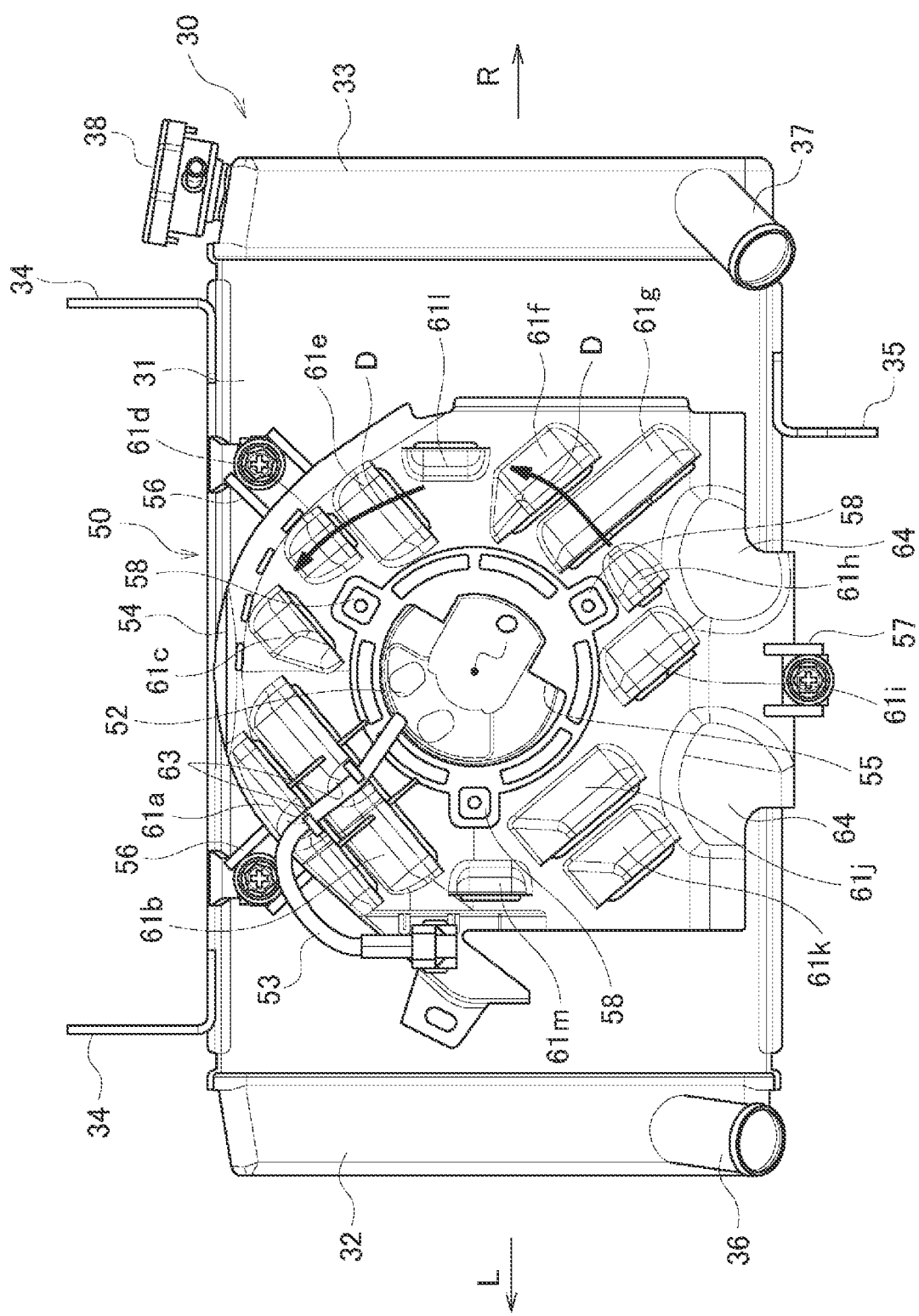
FIG. 2 is a rear view of a radiator and a radiator fan according to the present embodiment.
Figure 3:
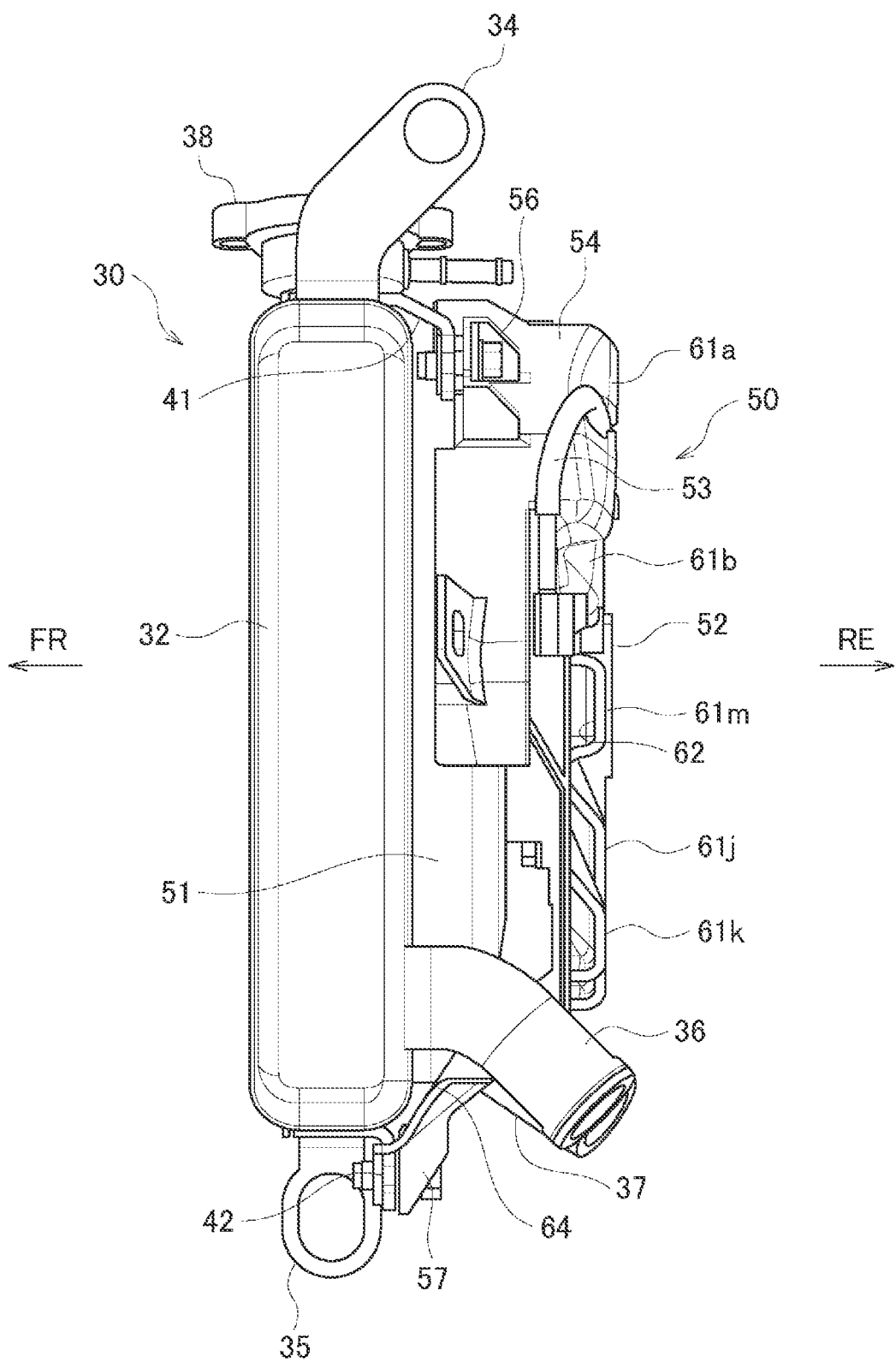
FIG. 3 is a left side view of the radiator and the radiator fan according to the present embodiment.
Figure 4:
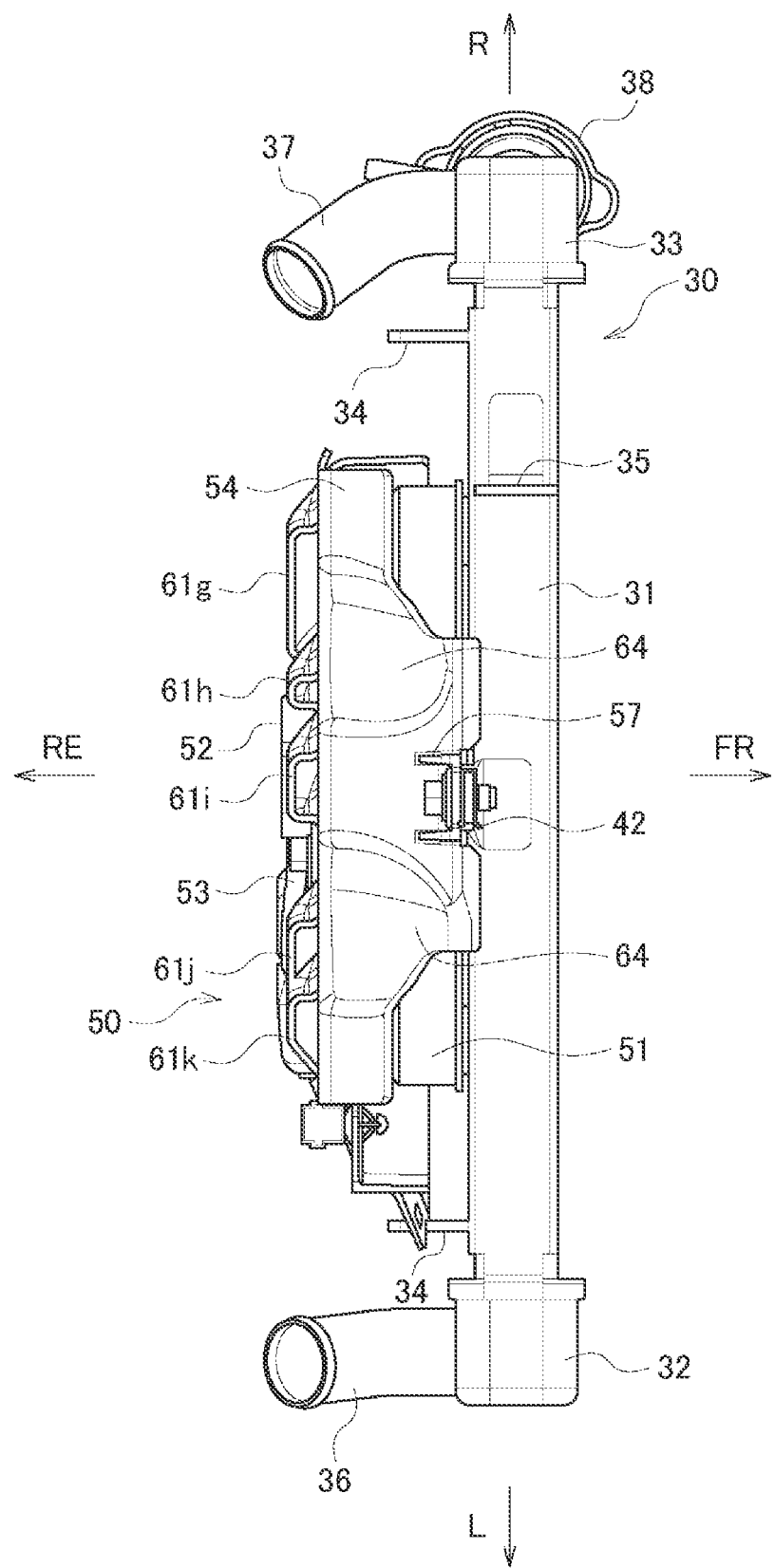
FIG. 4 is a bottom view of the radiator and the radiator fan according to the present embodiment.

The radiator and the radiator fan will be described with reference to FIGS. 2 to 4. FIG. 2 is a rear view of the radiator and the radiator fan according to the present embodiment. FIG. 3 is a left side view of the radiator and the radiator fan according to the present embodiment. FIG. 4 is a bottom view of the radiator and the radiator fan according to the present embodiment.

As shown in FIGS. 2 to 4, the radiator 30 includes a radiator core 31 having a rectangular plate shape, a left side tank 32 provided on a left side of the radiator core 31, and a right side tank 33 provided on a right side of the radiator core 31. The radiator core 31 includes a large number of water tubes (not shown) connecting the left side tank 32 and the right side tank 33, and a large number of heat radiation fins (not shown) intersecting the large number of water tubes. A pair of left and right upper stays 34 extend upward from an upper surface of the radiator core 31, and a single lower stay 35 protrudes from a lower surface of the radiator 30.

The left side tank 32 extends along a left side edge of the radiator core 31, and an inlet pipe 36 is provided on a rear surface of the left side tank 32. The inlet pipe 36 is connected to the engine 20 (see FIG. 1) via an inlet hose (not shown), and the cooling water is sent from the engine 20 to the left side tank 32. The right side tank 33 extends along a right side edge of the radiator core 31, and an outlet pipe 37 is provided on a rear surface of the right side tank 33. The outlet pipe 37 is connected to the engine 20 via an outlet hose (not shown), and the cooling water is sent from the right side tank 33 to the engine 20.

A water injection port for the cooling water is formed on an upper surface of the right side tank 33, and a radiator cap 38 is attached to the water injection port. The cooling water flows from the left side tank 32 toward the right side tank 33, and the outside air passes from a front surface to a rear surface of the radiator core 31, so that the heat exchange is performed between the cooling water and the outside air. At the time of high-speed traveling, the traveling air passes through the radiator core 31, and the radiator 30 releases heat by the traveling air. At the time of stopping, low-speed traveling, or the like, the radiator fan 50 on the rear surface side of the radiator 30 operates, and the radiator 30 releases heat by the outside air introduced by the radiator fan 50.

The radiator fan 50 is an axial flow type propeller fan, and a propeller 51 is disposed behind the radiator 30. Although a shape of the propeller 51 is simplified here, the propeller 51 actually has a plurality of blades aligned in a circumferential direction. A center portion of the propeller 51 is connected to an output shaft of the fan motor 52, and the propeller 51 is driven to rotate by the fan motor 52. The fan motor 52 is formed in a flat shape, and a thickness of the radiator fan 50 in a front-rear direction is reduced. The fan motor 52 is attached to the radiator 30 by the fan shroud 54 made of resin.

The fan shroud 54 is located at a center of a rear surface of the radiator 30. An upper half portion of the fan shroud 54 is formed in a semicircular shape in a rear view, and a rear side and an outer periphery of the propeller 51 are covered by the upper half portion of the fan shroud 54. A lower half portion of the fan shroud 54 is formed in a rectangular shape in the rear view, and the rear side and a lower center of the propeller 51 are covered by the lower half portion of the fan shroud 54. That is, left and right sides of the fan shroud 54 excluding a side surface and a center of the lower half portion of the fan shroud 54 are opened. A center of a rear surface of the fan shroud 54 is cut out, and the fan motor 52 is exposed from a notch 55.

A pair of upper fan stays 56 protrude from two positions of an upper portion of the fan shroud 54 in the left and right, and a lower fan stay 57 protrudes from a center position of a lower portion of the fan shroud 54. The pair of upper fan stays 56 are screwed to brackets 41 that hang rearward from the upper surface of the radiator core 31, and the lower fan stay 57 is screwed to a bracket 42 that hangs rearward from a lower surface of the radiator core 31. Attachment portions 58 are provided at three positions of a peripheral edge portion of the notch 55 on the rear surface of the fan shroud 54, and the fan motor 52 is attached to the fan shroud 54 by the three attachment portions 58.

A plurality of hoods 61a to 61m are formed around the notch 55 of the fan shroud 54. The plurality of hoods 61a to 61m are formed to have various sizes in accordance with arrangement places such that as many the hoods 61a to 61m as possible are disposed on the rear surface of the fan shroud 54. Since the plurality of hoods 61a to 61m are disposed so as to fill the rear surface of the fan shroud 54, a sufficient opening area in the fan shroud 54 is secured by exhaust air ports of the plurality of hoods 61a to 61m. Since the fan shroud 54 has the sufficient opening area, the traveling air and the exhaust air of the propeller 51 is not difficult to discharge by the fan shroud 54.

Exhaust air ports 62 of the plurality of hoods 61a to 61m are directed in any directions within a range from the lateral direction to the downward direction. The hoods 61a to 61e are disposed on an upper side of a rotational center O of the propeller 51, and the exhaust air ports 62 of the hoods 61a to 61e are directed obliquely downward to the right. The hoods 61f to 61k are disposed on a lower side of the rotational center O of the propeller 51, and the exhaust air ports 62 of the hoods 61f to 61k are directed obliquely downward to the left. The hood 61l is disposed on a right side of the rotational center O of the propeller 51, and the exhaust air port 62 of the hood 61l is directed to the right side. The hood 61m is disposed on a left side of the rotational center O of the propeller 51, and the exhaust air port 62 of the hood 61m is directed to the left side.

A rotation direction D of the propeller 51 is counterclockwise, and the rotation direction D of the propeller 51 and exhaust directions from the exhaust air ports 62 of the plurality of hoods 61a to 61m do not match. For example, at a position of 12 o'clock, the rotation direction D of the propeller 51 is a left direction, and the exhaust direction of the hood 61c is a direction directed obliquely downward to the right. At a position from 1 o'clock to 2 o'clock, the rotation direction D of the propeller 51 is a direction directed obliquely upward to the left, and the exhaust direction of the hoods 61d, 61e is the direction directed obliquely downward to the right. At a position of 3 o'clock, the rotation direction D of the propeller 51 is an upward direction, and the exhaust direction of the hood 61l is a right direction. Also at other positions, the rotation direction D of the propeller 51 and the exhaust directions of the plurality of hoods 61a to 61m intersect with each other or are opposite to each other.

In this manner, since the exhaust directions from the exhaust air ports 62 of the hoods 61a to 61m are directed to a lower side or a lateral side of the vehicle so as not to be directed to a rear side or an upper side of the vehicle, hot air passing through the radiator 30 is less likely to be directed to the rider behind the engine 20 (see FIG. 1). Further, since the rotation direction D of the propeller 51 and the exhaust directions of the hoods 61a to 61m are different from each other, the exhaust air from the propeller 51 hits inner surfaces of the hoods 61a to 61m, and momentum of the exhaust air blown out from the exhaust air ports 62 is reduced, so that the thermal damage to the rider can be suppressed. Further, even if the fan shroud 54 is provided in the radiator 30, the traveling air and the exhaust air of the propeller 51 is not difficult to discharge.

The hoods 61a, 61h are disposed on the upper side of the rotational center O of the propeller 51 and disposed obliquely upward to the left with respect to the fan motor 52. The exhaust air ports 62 of the hoods 61a, 61b are directed obliquely downward to the right, and the fan motor 52 is disposed at an exhaust air destination of the exhaust air ports 62 of the hoods 61a, 61b. Since the exhaust air ports 62 of the hoods 61a, 61b are directed toward the fan motor 52, the traveling air or the exhaust air of the propeller 51 is blown from the hoods 61a, 61b to the fan motor 52 to cool the fan motor 52. Even when the radiator fan 50 is brought close to the exhaust pipes 28 (see FIG. 1), a function of the fan motor 52 is suppressed from being deteriorated by hot air from the exhaust pipes 28.

The hoods 61f to 61i are disposed on the lower side of the rotational center O of the propeller 51 and disposed obliquely upward to the right with respect to the pair of exhaust pipes 28. The exhaust air ports 62 of the hoods 61f to 61i are directed obliquely downward to the left, and the pair of exhaust pipes 28 are disposed at an exhaust air destination of the exhaust air ports 62 of the hoods 61f to 61i. Since the exhaust air ports 62 of the hoods 61f to 61i are directed toward the pair of exhaust pipes 28, the traveling air or the exhaust air of the propeller 51 is blown from the hoods 61f to 61i to the pair of exhaust pipes 28 to cool the pair of exhaust pipes 28. Thermal damage to the fan motor 52 due to the hot air from the pair of exhaust pipes 28 is suppressed, and the radiator fan 50 can be brought further closer to the pair of exhaust pipes 28.

Although the hoods 61a to 61m bulge rearward from the rear surface of the fan shroud 54, a bulging amount of the hoods 61a to 61m from the rear surface of the fan shroud 54 is substantially equal to a bulging amount of the fan motor 52 from the rear surface of the fan shroud 54. Even if the hoods 61a to 61m are formed on the rear surface of the fan shroud 54, an existing layout is not broken. A lead wire 53 extends from a side surface of the fan motor 52, and holding portions 63 for holding the lead wire 53 of the fan motor 52 are formed in the hoods 61a, 61b. The holding portions 63 are formed by partially denting the hoods 61a, 61b.

Since a lower center of the fan shroud 54 is not open, the lower portion of the fan shroud 54 blocks the hot air from the pair of exhaust pipes 28, thereby suppressing thermal damage to the radiator fan 50. A pair of concave surfaces 64 that avoid the pair of exhaust pipes 28 are formed in the lower portion of the fan shroud 54. The pair of concave surfaces 64 face the pair of exhaust pipes 28, and a sufficient facing distance between the fan shroud 54 and the pair of exhaust pipes 28 is secured by the pair of concave surfaces 64. As a result, the distance between the fan shroud 54 and the pair of exhaust pipes 28 is reduced, and a degree of freedom in a vehicle layout is improved.

Figure 5:
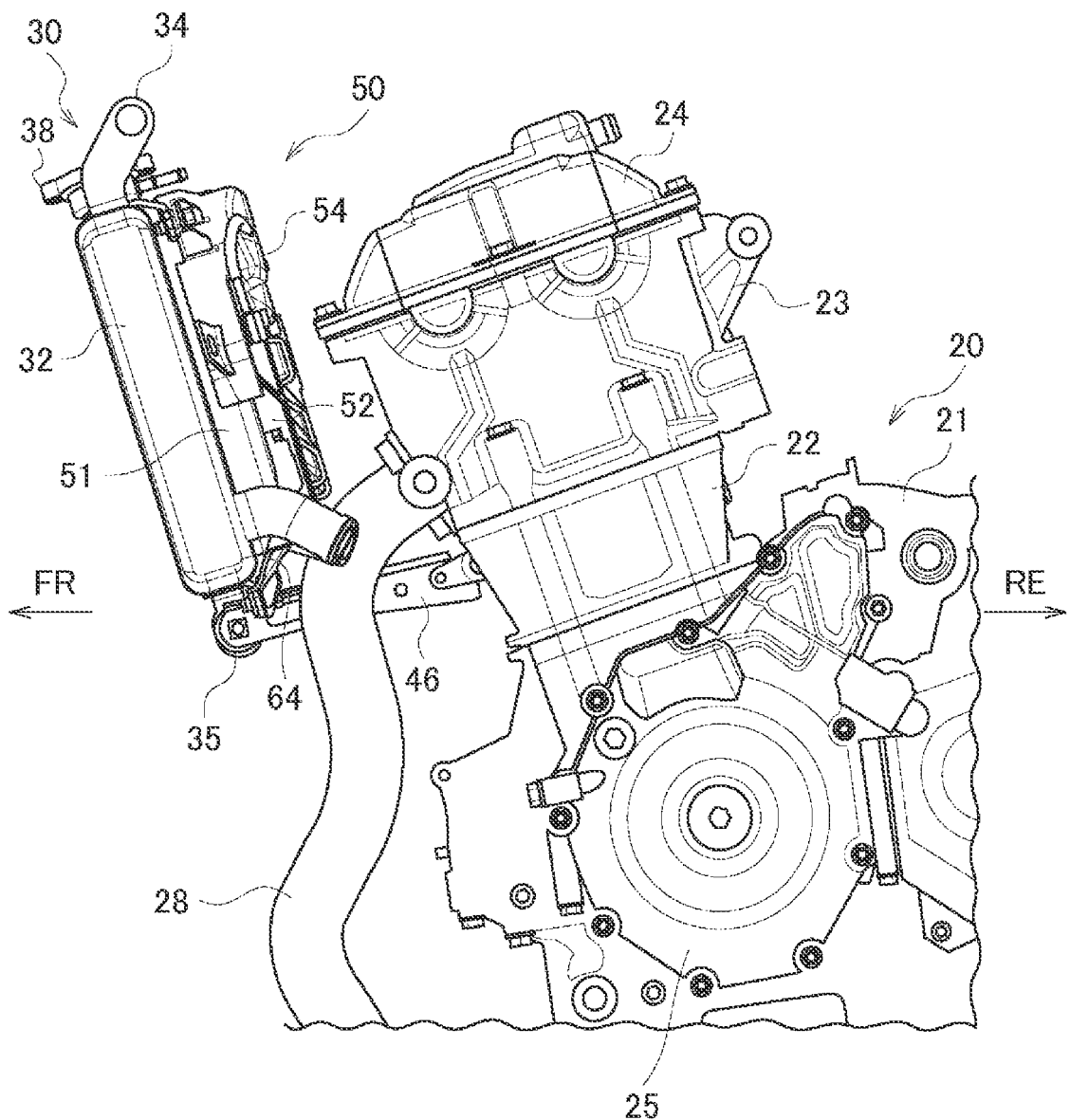
FIG. 5 is a side view of a periphery of an engine according to the present embodiment.
Figure 6:
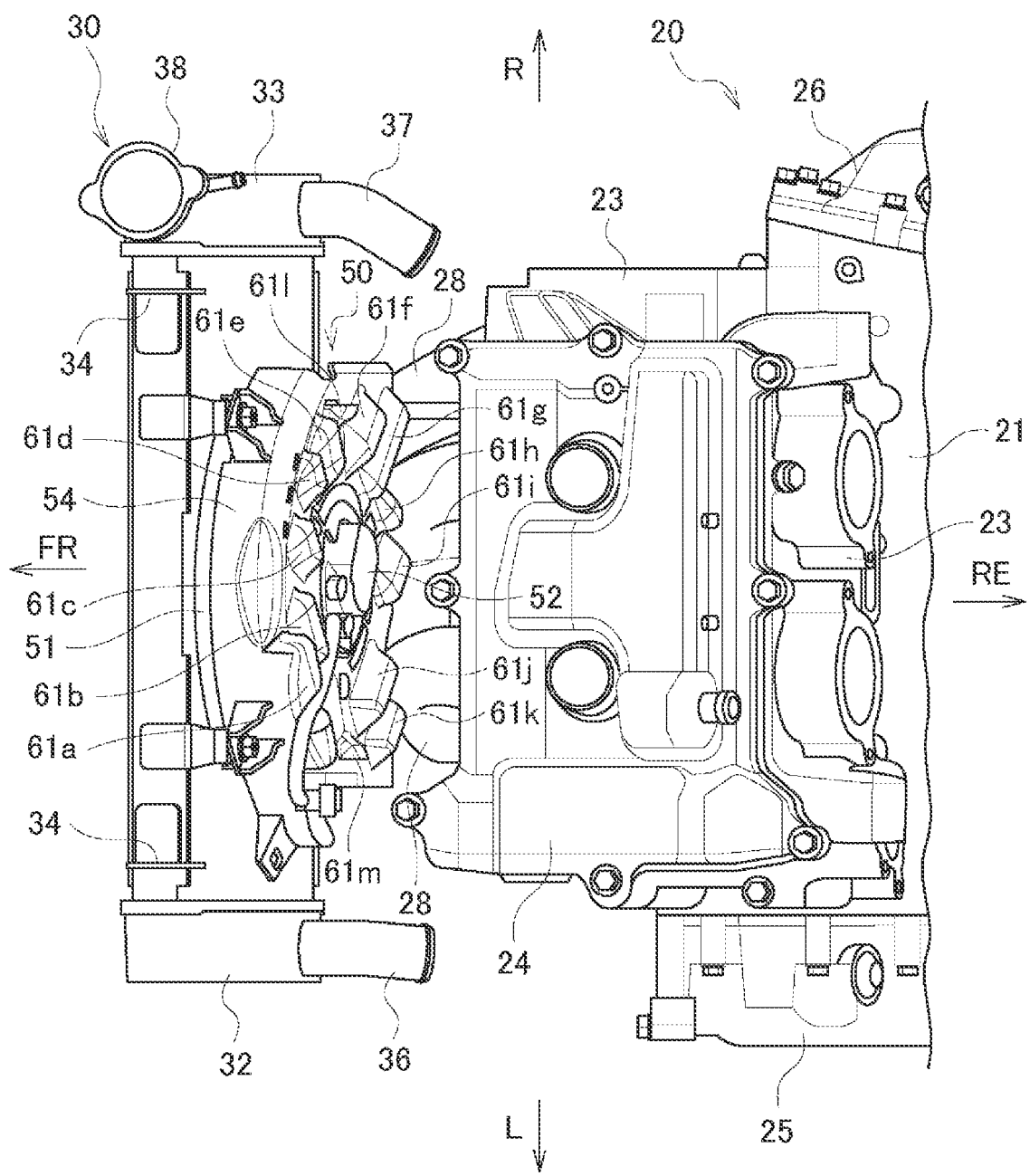
FIG. 6 is a top view of the periphery of the engine according to the present embodiment.

A flow of the exhaust air from the radiator fan will be described with reference to FIGS. 5 and 6. FIG. 5 is a side view of a periphery of the engine according to the present embodiment. FIG. 6 is a top view of the periphery of the engine according to the present embodiment.

As shown in FIGS. 5 and 6, the radiator 30 is provided with the pair of upper stays 34 and the single lower stay 35. The pair of upper stays 34 are supported by the vehicle body frame 10 (see FIG. 1) via a pair of frame brackets 45 (see FIG. 1), and the lower stay 35 is supported by the cylinder 22 via an engine bracket 46. The upper stays 34 and the frame brackets 45 are connected to each other via a rubber cushion, and the lower stay 35 and the engine bracket 46 are connected to each other via a rubber cushion. The radiator 30 is floatingly supported by the vehicle body frame 10 and the engine 20 by the rubber cushion.

The pair of exhaust pipes 28 extend downward from the front surface of the cylinder head 23, and the radiator 30 is located above the pair of exhaust pipes 28 in front of the engine 20. A large distance in the front and rear between the radiator 30 and the engine 20 is secured, so that the exhaust air easily flows from the radiator 30. The radiator fan 50 is attached to the rear surface of the radiator 30, and the radiator fan 50 is located in a space surrounded by the radiator 30, the engine 20, and the pair of exhaust pipes 28. The radiator fan 50 is located at the center of the radiator 30 in a top view, and an upper portion of the radiator fan 50 is located above the cylinder head 23 in a side view.

The radiator fan 50 is provided with the fan shroud 54 for avoiding the thermal damage to the rider due to the exhaust air from the propeller 51. Since the hoods 61a to 61m are formed on the rear surface of the fan shroud 54 in the above manner, the traveling air and the exhaust air of the propeller 51 is not difficult to discharge by the fan shroud 54. Since the exhaust air is discharged obliquely downward and laterally from the hoods 61a to 61m, even if the traveling air and the exhaust air of the propeller 51 is discharged from the fan shroud 54, the thermal damage to the rider behind the engine 20 is suppressed. As compared with a configuration in which a baffle plate or the like is disposed, the number of components is reduced and a cost is reduced.

For the radiator fan 50, a component that does not have high heat resistance, such as the fan motor 52, is used. Therefore, normally, the vehicle layout is restricted so as to secure a sufficient clearance between the radiator fan 50 and the pair of exhaust pipes 28. As described above, the exhaust air ports 62 of the hoods 61*a*, 61*b* are directed toward the fan motor 52, and the exhaust air ports 62 of the hoods 61*f* to 61*i* are directed toward the pair of exhaust pipes 28. The fan motor 52 is cooled by the exhaust air from the hoods 61*a*, 61*b*, and the pair of exhaust pipes 28 are cooled by the exhaust air from the hoods 61*f* to 61*i*. Therefore, the radiator fan 50 is brought close to the pair of exhaust pipes 28, and the degree of freedom in the vehicle layout is improved.

The lower portion of the fan shroud 54 wider than a motor width is interposed between the pair of exhaust pipes 28 and the radiator 30, and the pair of concave surfaces 64 that avoid the exhaust pipes are formed in the lower portion of the fan shroud 54. Curved portions of the pair of exhaust pipes 28 face the pair of concave surfaces 64, and a distance between the pair of concave surfaces 64 and the curved portions of the pair of exhaust pipes 28 is reduced. The heat from the pair of exhaust pipes 28 is blocked by the lower portion of the fan shroud 54, and the lower portion of the fan shroud 54 and the pair of exhaust pipes 28 serve as walls to protect the radiator fan 50 from small stones that are flipped up from the ground. The small stones are less likely to clog between the propeller 51 and the fan motor 52, so that the propeller 51 is suppressed from being locked.

In the fan shroud 54, the hoods 61*f* to 61*k* are disposed on the lower side of the rotational center O (see FIG. 2) of the propeller 51, and the hoods 61*f* to 61*k* are located between the fan motor 52 and the pair of exhaust pipes 28. As described above, the bulging amount of the hoods 61*f* to 61*k* from the rear surface of the fan shroud 54 is substantially equal to the bulging amount of the fan motor 52 from the rear surface of the fan shroud 54, the hoods 61*f* to 61*k* function as heat shielding plates for the hot air from the pair of exhaust pipes 28 to the fan motor 52. The heat from the pair of exhaust pipes 28 is blocked by the hoods 61*f* to 61*k*, and the thermal damage to the fan motor 52 is suppressed.

As described above, according to the present embodiment, although the propeller 51 is covered by the fan shroud 54 from behind, since the plurality of hoods 61*a* to 61*m* are formed in the fan shroud 54, it does not become difficult for the traveling air and the exhaust air of the propeller 51 to discharge. In addition, since the exhaust air ports 62 of the hoods 61*a* to 61*m* are directed in any directions in the range from the lateral direction to the downward direction, the hot air passing through the radiator core 31 is less likely to be directed to the rider behind the engine 20. Therefore, the cooling performance of the radiator fan 50 can be maintained while suppressing the thermal damage to the rider.

In addition, in the present embodiment, a two-cylinder engine is exemplified as the engine, but a type of the engine is not particularly limited.

Further, in the present embodiment, the plurality of hoods are provided in the fan shroud so as not to be opened and closed, but the plurality of hoods may be provided in the fan shroud so as to be opened and closed. In this case, the plurality of hoods are provided with return springs, and the plurality of hoods are opened and closed according to a magnitude of a wind pressure applied to the plurality of hoods. The plurality of hoods are closed under a wind pressure in which the propeller is driven, and when a vehicle speed reaches a certain vehicle speed or higher, which is equal to or higher than the wind pressure in which the propeller is driven, the hoods are opened by a wind pressure of the traveling air. Even when the propeller is driven while there is no traveling air, the hoods are closed, and thus, the thermal damage to the rider is reduced. Further, the hoods are opened by the wind pressure of the traveling air, so that the radiator can be further cooled. In addition, even when the propeller is driven while there is constant traveling air, exhaust air heat of the propeller is reduced by the traveling air, and the rider can hardly feel the heat.

Further, in the present embodiment, the plurality of hoods are formed on the rear surface of the fan shroud, but the plurality of hoods may be formed on the side surface of the fan shroud.

Further, in the present embodiment, equipment of the straddle-type vehicle is not particularly described, but the equipment may be formed in an air guide shape in which the traveling air or the exhaust air is directed to the fan motor.

In addition, in the present embodiment, the exhaust air ports of the hoods on the upper side of the rotational center of the propeller are directed toward the fan motor, but the exhaust air ports of these hoods may be directed in any direction within the range from the lateral direction to the downward direction, and may not be directed toward the fan motor.

In addition, in the present embodiment, the exhaust air ports of the hoods on the lower side of the rotational center of the propeller are directed toward the exhaust pipes, but the exhaust air ports of these hoods may be directed in any direction within the range from the lateral direction to the downward direction, and may not be directed toward the exhaust pipes.

Further, in the present embodiment, the upper half portion of the fan shroud is formed in the semicircular shape in the rear view; and the lower half portion of the fan shroud is formed in the rectangular shape in the rear view, but the shape of the fan shroud is not particularly limited. The fan shroud may be formed so as to cover at least the propeller from behind.

Further, the directions of the exhaust air ports of the plurality of hoods according to the present embodiment are described as an example, and the exhaust air ports of the plurality of hoods may be directed in any direction within the range from the lateral direction to the downward direction.

In the present embodiment, the bulging amount of the plurality of hoods from the rear surface of the fan shroud is substantially equal to the bulging amount of the fan motor from the rear surface of the fan shroud, but the bulging amount of the plurality of hoods is not particularly limited. It is preferable that the bulging amount of the plurality of hoods from the rear surface of the fan shroud is reduced to be equal to or less than the bulging amount of the fan motor from the rear surface of the fan shroud so as not to break the existing vehicle layout.

The radiator fan is not limited to be applied to the straddle-type vehicle shown in the drawings, and may be applied to other types of saddle-ride type vehicles. The straddle-type vehicle is not limited to general vehicles on which a rider rides in a posture of straddling a seat, and also includes a small-sized scooter-type vehicle on which a rider rides without straddling a seat.

As described above, the radiator fan (50) according to the present embodiment is a radiator fan configured to introduce outside air into a radiator (30) in front of an engine (20). The radiator fan includes a propeller (51) disposed behind the radiator, a fan motor (52) configured to drive the propeller to rotate, and a fan shroud (54) covering the propeller from behind. The fan shroud is provided with a plurality of hoods (61a-61m) whose the exhaust air ports (62) are directed in any directions in a range from a lateral direction to a downward direction. According to this configuration, although the propeller is covered by the fan shroud from behind, since the plurality of hoods are formed in the fan shroud, it does not become difficult for the traveling air and the exhaust air of the propeller to discharge. In addition, since the exhaust air ports of the hoods are directed in any directions in the range from the lateral direction to the downward direction, hot air passing through the radiator core is less likely to be directed to the rider behind the engine. Therefore, cooling performance of the radiator fan can be maintained while suppressing thermal damage to the rider.

In the radiator fan according to the present embodiment, the exhaust air port of the hood, among the plurality of hoods, on an upper side of a rotational center of the propeller is directed toward the fan motor. According to this configuration, the traveling air or the exhaust air of the propeller is blown from the hoods to the fan motor, and the fan motor is cooled, thereby suppressing the function of the fan motor from being deteriorated due to the hot air. The restriction on the vehicle layout of the fan motor due to the thermal damage is alleviated, and the radiator fan can be brought close to a heat source such as the exhaust pipes.

In the radiator fan according to the present embodiment, the exhaust air port of the hood, among the plurality of hoods, on a lower side of a rotational center of the propeller is directed toward an exhaust pipe (28) extending from the engine. According to this configuration, the traveling air or the exhaust air of the propeller is blown from the hoods to the exhaust pipes, and the exhaust pipes are cooled, thereby suppressing the thermal damage to the fan motor. The restriction on the vehicle layout of the fan motor due to the thermal damage is alleviated, and the radiator fan can be brought close to a heat source such as the exhaust pipes.

In the radiator fan according to the present embodiment, a lower portion of the fan shroud is interposed between an exhaust pipe extending from the engine and the radiator, and a concave surface (64) avoiding the exhaust pipe is formed in the lower portion of the fan shroud. According to this configuration, the heat from the exhaust pipes is blocked by the lower portion of the fan shroud, so that the thermal damage to the radiator fan is suppressed. Since the concave surfaces are formed in the fan shroud, the distance between the fan shroud and the exhaust pipes is shortened.

In the radiator fan according to the present embodiment, exhaust directions from the exhaust air ports of the plurality of hoods do not coincide with a rotation direction of the propeller. According to this configuration, when the propeller is driven, the exhaust air hits the inner surfaces of the hoods, and the momentum of the exhaust air is reduced, so that the thermal damage to the rider can be suppressed.

In the radiator fan according to the present embodiment, the plurality of hoods bulge rearward from a rear surface of the fan shroud, and a bulging amount of the plurality of hoods from the rear surface of the fan shroud is reduced to be equal to or less than a bulging amount of the fan motor from the rear surface of the fan shroud. According to this configuration, even if the plurality of hoods are formed on the rear surface of the fan shroud, the existing vehicle layout is not broken.

In the radiator fan according to the present embodiment, the hood, among the plurality of hoods, on a lower side of a rotational center of the propeller is located between the fan motor and an exhaust pipe extending from the engine. According to this configuration, since the hoods function as the heat shielding plates, the thermal damage to the fan motor caused by the exhaust pipes can be suppressed.

Although the present embodiment has been described, the above-described embodiment and modifications thereof may be combined entirely or partially as other embodiments.

The technique of the present invention is not limited to the above-described embodiment, and various changes, substitutions, and modifications may be made without departing from the spirit of the technical idea of the present invention. The present invention may be implemented by other methods as long as the technical idea can be implemented by the methods through advance of the technique or other derivative techniques. Therefore, the claims cover all embodiments that may be included within the scope of the technical idea.

What is claimed is:

1. A radiator fan configured to introduce outside air into a radiator in front of an engine, the radiator fan comprising:
   a propeller disposed behind the radiator;
   a fan motor configured to drive the propeller to rotate; and
   a fan shroud covering the propeller from behind,
   wherein the fan shroud is formed with a plurality of hoods whose exhaust air ports are directed in any directions in a range from a lateral direction to a downward direction, and
   the plurality of hoods are disposed so as to fill a rear surface of the fan shroud.

2. The radiator fan according to claim 1,
   wherein the exhaust air port of the hood, among the plurality of hoods, on an upper side of a rotational center of the propeller is directed toward the fan motor.

3. The radiator fan according to claim 1,
   wherein the exhaust air port of the hood, among the plurality of hoods, on a lower side of a rotational center of the propeller is directed toward an exhaust pipe extending from the engine.

4. The radiator fan according to claim 1,
   wherein a lower portion of the fan shroud is interposed between an exhaust pipe extending from the engine and the radiator, and a concave surface avoiding the exhaust pipe is formed in the lower portion of the fan shroud.

5. The radiator fan according to claim 1,
   wherein exhaust directions from the exhaust air ports of the plurality of hoods do not coincide with a rotation direction of the propeller.

6. The radiator fan according to claim 1,
   wherein the plurality of hoods bulge rearward from the rear surface of the fan shroud, and a bulging amount of the plurality of hoods from the rear surface of the fan shroud is reduced to be equal to or less than a bulging amount of the fan motor from the rear surface of the fan shroud.

7. The radiator fan according to claim 6,
   wherein the hood, among the plurality of hoods, on a lower side of a rotational center of the propeller is located between the fan motor and an exhaust pipe extending from the engine.

* * * * *